No. 770,958. PATENTED SEPT. 27, 1904.
T. L. BROWN.
WEEDER.
APPLICATION FILED DEC. 24, 1903.
NO MODEL.
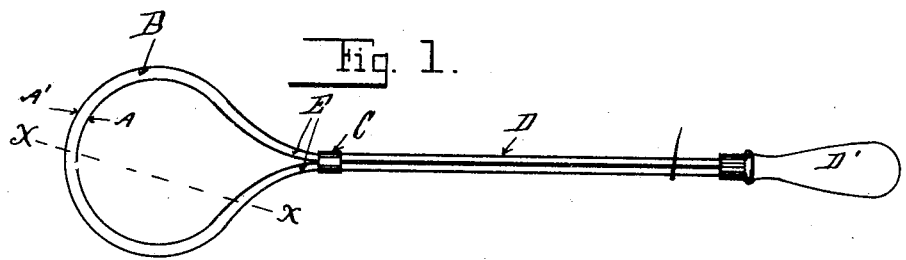
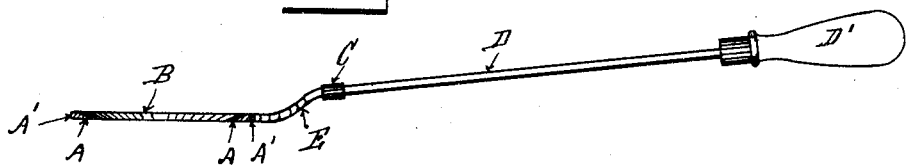
Witnesses.
G. J. Mead
Florence Stockert.
Inventor.
Thomas L. Brown
By J.C. & H. M. Sturgeon
Attys No. 770,958.

Patented September 27, 1904.

UNITED STATES PATENT OFFICE.

THOMAS L. BROWN, OF BLACKHALL, CONNECTICUT.

WEEDER.

SPECIFICATION forming part of Letters Patent No. 770,958, dated September 27, 1904.

Application filed December 24, 1903. Serial No. 186,460. (No model.)

*To all whom it may concern:*

Be it known that I, THOMAS L. BROWN, a citizen of the United States, residing at Blackhall, in the county of New London and State of Connecticut, have invented certain new and useful Improvements in Weeders; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to weeders, and has for its object the construction of a weeding-tool in such shape that it can be operated to skim the surface or just under the surface of the ground, so as to destroy and remove weeds therefrom without materially disturbing the surface of the ground.

Another feature of the tool is that it is oval in shape, and its outer edge is rounded and has no angles or projections, whereby the operator is enabled to operate it in close proximity to or in contact with the stems of delicate plants without danger of injury thereto.

The features of my invention are hereinafter fully set forth and described, and illustrated in the accompanying drawings, in which—

Figure 1 is a top or plan view of my improved weeder. Fig. 2 is a side view of the same, partially in section, on the line $x\ x$ in Fig. 1.

In the construction of my improved weeder I preferably take a metal rod, preferably of steel, and flatten the central portion thereof, so as to form a sharp edge A on one side and a thick rounded edge A' on the opposite side, as is clearly shown by the section thereof in Fig. 2, and I then bend the portion so flattened so as to form an oval-shaped loop B thereof, with the sharp edge A forming the inner and the thick rounded edge A' the outer periphery of the loop B. In forming the loop B the end portions of the rod are brought together and secured by a loop or ferrule C, so as to form a portion D of the handle D', by means whereof the tool can be operated. I also preferably make a small offset E therein at or near the juncture of the loop B and the handle portion D, so that the handle is somewhat raised above the ground when the tool is in operation.

I have herein shown and described a simple and preferable construction of my improved weeder. It is obvious, however, that the loop B and the handle D D' may be made of separate sections or that instead of making them of a rod flattened and bent, as described, it might be made of malleable-iron casting, as the substantial feature thereof is the loop-shaped blade with its inner periphery brought to a sharp edge, while its outer periphery is of considerable thickness and rounded and smooth.

Therefore what I claim as new, and desire to secure by Letters Patent of the United States, is—

1. The combination in a weeder, of an oval, ring shaped loop the outer periphery of which is thick and smooth, and its inner periphery a thin sharp cutting edge substantially on the same horizontal plane therewith, and a handle secured thereto, substantially as set forth.

2. The combination in a weeder, of a blade in the form of an oval ring shaped loop having its inner periphery a sharp edge substantially on the same horizontal plane therewith and its outer periphery thick and rounded, and an operating-handle secured thereto and offset from the plane of the blade, substantially as and for the purpose set forth.

In testimony whereof I affix my signature in presence of two witnesses.

THOMAS L. BROWN.

Witnesses:
 THOMAS MATHER,
 JOHN SWANEY.